United States Patent
Isono (10) Patent No.: US 11,525,491 B2
(45) Date of Patent: Dec. 13, 2022

(54) ELECTROMAGNETIC BRAKE DEVICE

(71) Applicant: TOYOTA JIDOSHA KABUSHIKI KAISHA, Toyota (JP)

(72) Inventor: Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 17/026,729

(22) Filed: Sep. 21, 2020

(65) Prior Publication Data
US 2021/0102587 A1    Apr. 8, 2021

(30) Foreign Application Priority Data
Oct. 8, 2019 (JP) .............................. JP2019-185323

(51) Int. Cl.
*F16D 63/00* (2006.01)
*F16D 65/18* (2006.01)
(Continued)

(52) U.S. Cl.
CPC ........... *F16D 63/002* (2013.01); *F16D 55/02* (2013.01); *F16D 65/18* (2013.01); *F16D 65/567* (2013.01); *F16D 66/00* (2013.01); *B60T 1/065* (2013.01); *B60T 13/741* (2013.01); *B60T 13/746* (2013.01); *F16D 2065/386* (2013.01); *F16D 2066/005* (2013.01); *F16D 2121/20* (2013.01); *F16D 2121/24* (2013.01); *F16D 2125/40* (2013.01);
(Continued)

(58) Field of Classification Search
CPC ...... F16D 65/18; F16D 65/186; F16D 65/567; F16D 66/00; F16D 55/02; F16D 63/002; F16D 2066/005; F16D 2121/20; B60T 13/748
See application file for complete search history.

(56) References Cited

U.S. PATENT DOCUMENTS

| 2008/0210512 A1* | 9/2008 | Pescheck | ............. H02K 7/11 192/84.31 |
| 2013/0092502 A1* | 4/2013 | Onitake | ............. F16D 55/00 192/93 R |

(Continued)

FOREIGN PATENT DOCUMENTS

| CN | 110095676 A | * | 8/2019 | .......... B25J 19/0004 |
| DE | 102008037720 A1 | * | 2/2010 | ............ F16D 65/18 |

(Continued)

*Primary Examiner* — Vishal R Sahni
(74) *Attorney, Agent, or Firm* — Sughrue Mion, PLLC (57) ABSTRACT

An electromagnetic brake device presses a pressing plate against a brake rotor along an axis via a friction material by the electromagnetic force of an electromagnetic actuator. The electromagnetic brake device includes a support member that is disposed on the opposite side of the pressing plate to the brake rotor and that is supported by a housing so as to be displaceable along the axis and non-rotatable around the axis, and a shaft member that transmits a force in the direction along the axis between the pressing plate and the support member. An electromagnetic coil and an armature of the electromagnetic actuator are spaced apart from the pressing plate between the pressing plate and the support member, the electromagnetic coil is supported by the housing, and the armature is supported by the support member.

5 Claims, 3 Drawing Sheets

(51) Int. Cl.
    *F16D 66/00*     (2006.01)
    *F16D 65/56*     (2006.01)
    *F16D 55/02*     (2006.01)
    *F16D 125/40*     (2012.01)
    *F16D 127/02*     (2012.01)
    *F16D 121/20*     (2012.01)
    *F16D 129/04*     (2012.01)
    *B60T 1/06*     (2006.01)
    *B60T 13/74*     (2006.01)
    *F16D 121/24*     (2012.01)
    *F16D 65/38*     (2006.01)

(52) U.S. Cl.
    CPC ...... *F16D 2127/02* (2013.01); *F16D 2129/04* (2013.01)

(56) References Cited

U.S. PATENT DOCUMENTS

| | | | | |
|---|---|---|---|---|
| 2019/0170200 A1* | 6/2019 | Isono | .................... | F16D 65/186 |
| 2020/0132149 A1* | 4/2020 | Chandrasekara | ...... | H02K 11/35 |
| 2021/0102587 A1* | 4/2021 | Isono | ...................... | F16D 66/00 |

FOREIGN PATENT DOCUMENTS

| | | |
|---|---|---|
| JP | 2019-108916 A | 7/2019 |
| WO | WO-2018047846 A1 * | 3/2018 |

\* cited by examiner

ELECTROMAGNETIC BRAKE DEVICE

CROSS-REFERENCE TO RELATED APPLICATION

This application claims priority to Japanese Patent Application No. JP2019-185323 filed on Oct. 8, 2019, the content of which is hereby incorporated by reference in its entirety into this application.

BACKGROUND

1. Technical Field

The present disclosure relates to an electromagnetic brake device.

2. Description of the Related Art

The electromagnetic brake device presses a friction member against a rotating member by an electromagnetic force instead of a hydraulic pressure and generates a braking force by a frictional force between the rotating member and the friction member. For example, Japanese Patent Application Laid-open Publication No. 2019-108916 describes a braking/driving apparatus suitable for a vehicle such as an electric vehicle, in which an electromagnetic brake device that generates a braking force and an electromagnetic drive device that generates a driving force are integrally configured.

A conventional electromagnetic brake device includes a brake rotor that rotates around an axis in conjunction with a rotating member such as a wheel that is to be braked, a friction member, and an electromagnetic actuator that presses the friction member against the brake rotor by an electromagnetic force. The friction member is supported by a housing such that it can reciprocate along the axis but is restricted from rotating about the axis, and is urged in a direction away from the brake rotor by a return spring.

In particular, the electromagnetic brake device shown in FIG. 4 of the above Publication includes a torque receiving member, a conversion mechanism, and a screw shaft, and an electromagnetic actuator functions as a friction member, and the electromagnetic actuator includes an armature that functions as a friction member and an electromagnetic coil that presses the armature against a brake rotor by an electromagnetic force. The conversion mechanism is arranged between the armature and the torque receiving member and converts a torque received from the brake rotor into an axial force when the armature is pressed against the brake rotor.

The torque receiving member is supported by the housing to be capable of reciprocating along an axis, but not to be rotatable about the axis and is screwed to a male screw of a screw shaft by a female screw provided on the inner peripheral portion. A pitch angle of the female screw provided on the inner peripheral portion and the male screw of the screw shaft is small, and the rotational movement of the screw shaft is converted into the linear movement along the axis of the torque receiving member, but the reverse conversion is not performed. The screw shaft has a flange, and a thrust bearing and a load detector are arranged between the flange and a housing that rotatably support the screw shaft.

An electric motor is attached to the housing, and an output shaft of the electric motor is connected to the screw shaft by a spline. When the screw shaft is rotated by driving the electric motor, the torque receiving member is moved along the axis, and further, the armature is moved. Therefore, the electric motor and the screw shaft function as an adjusting device that adjusts the position of the armature with respect to the brake rotor, and further presses the armature against the brake rotor during the parking brake to frictionally engage them.

During braking (during service braking), the armature is pressed against the brake rotor, and a torque received by the armature from the brake rotor is converted into axial force by the conversion mechanism and transmitted to the torque receiving member. The axial force is transmitted from the torque receiving member to the screw shaft and is transmitted to the housing via the flange, the thrust bearing, and the load detector. The axial force transmitted as described above is an index value of the braking force generated by the frictional engagement between the armature and the brake rotor, and the load detector detects this axial force.

A signal indicating the detected axial force is input to an electronic control unit, and a signal indicating an amount of braking operation such as a depression force on a brake pedal by a driver is also input to the electronic control unit. The electronic control unit calculates a target braking force of each wheel based on the braking operation amount and controls each electromagnetic actuator so that the axial force detected by the load detector becomes the axial force corresponding to the target braking force, whereby controlling an electromagnetic force that presses the friction member against the brake rotor.

Further, in the electromagnetic brake device shown in FIG. 4 of the above-mentioned Publication, the conversion mechanism includes grooves provided on the surfaces of the armature and the torque receiving member that face each other and rolling elements such as balls arranged between the grooves. Each groove has a depth set to gradually decrease away from the central portion in the circumferential direction, and when the armature is rotated by a torque received from the brake rotor with respect to the torque receiving member, a gap between the bottom surfaces of the grooves facing each other tends to decrease. However, since rolling elements prevent the gap between the bottom surfaces of the grooves from decreasing, the torque is converted into an axial force in the direction of separating the armature and the torque receiving member.

SUMMARY

In the conventional electromagnetic brake device, the armature and the brake rotor are frictionally engaged with each other during braking and are heated by friction heat. Since the electromagnetic coil is arranged close to the armature and the brake rotor, the electromagnetic coil is also heated. Therefore, for example, in a situation in which braking under severe conditions is repeatedly performed, the temperature of the electromagnetic coil becomes excessively high, and electric resistance of the conductive wire becomes high. As a result, as compared to where the temperature of the electromagnetic coil is not excessively high, a current value of the control current supplied to the electromagnetic coil is reduced, and an electromagnetic force generated by the electromagnetic coil is also reduced. Thus, the braking force generated by the electromagnetic brake device may be insufficient as compared with a required braking force.

In particular, in the electromagnetic brake device shown in FIG. 4 of the above Publication, the conversion mechanism is disposed between the armature and the torque receiving member, and the armature and the torque receiving member are separated by the conversion mechanism. Therefore, the heat of the armature is hard to be conducted to the torque receiving member, and the armature is likely to excessively heat up so that the above situation is likely to occur.

The present disclosure provides an electromagnetic braking device that is improved so that the temperature of the electromagnetic coil is less likely to rise and the risk of insufficient braking force is reduced in comparison with the conventional structure in which the armature is pressed against the brake rotor as a friction member by the excitation of the electromagnetic coil.

According to the present disclosure, an electromagnetic braking device is provided which includes a brake rotor that is configured to rotate about an axis in conjunction with a rotating member to be braked, a pressing plate that is supported to be displaceable with respect to the brake rotor along the axis and non-rotatable with respect to a housing about the axis, an electromagnetic actuator that generates an electromagnetic force and presses the pressing plate against the brake rotor via a friction material, and a return spring that biases the pressing plate in a direction away from the brake rotor.

The electromagnetic brake device includes a pressing force transmission device that transmits an electromagnetic force generated by the electromagnetic actuator to the pressing plate as a pressing force along the axis, and the pressing force transmission device includes a support member that is arranged on the opposite side of the pressing plate to the brake rotor with respect and is supported by the housing to be displaceable along the axis and non-rotatable around the axis and a shaft member that transmits a force in a direction along the axis between the pressing plate and the support member.

The electromagnetic brake device further includes a load detection device that is configured to detect a load transmitted between the pressing plate and the support member via the shaft member.

The electromagnetic actuator includes an electromagnetic coil and an armature that are spaced apart from the pressing plate between the pressing plate and the support member; the electromagnetic coil is supported by the housing; the armature is supported by the support member; and the armature, the support member, the shaft member, and the pressing plate are arranged to move integrally toward the brake rotor when an electromagnetic force is generated by the electromagnetic actuator.

According to the above configuration, the electromagnetic coil and the armature are arranged on the opposite side of the pressing plate to the brake rotor and are spaced apart from the pressing plate, and are supported by the housing and the support member, respectively. Therefore, the friction heat generated by the pressing plate being pressed against the brake rotor via the friction material is difficult to be transferred to the electromagnetic coil and the armature by heat conduction, so that the temperature rise of the electromagnetic coil and the armature can be reduced as compared with the conventional electromagnetic brake device.

Accordingly, even if braking under severe conditions is repeated, the temperature of the electromagnetic coil does not rise excessively. Therefore, it is possible to reduce the risk that an electromagnetic force generated by the electromagnetic coil is reduced and a generated braking force is insufficient as compared with the required braking force due to the fact that electric resistance of the conductor of the electromagnetic coil increases and a current value of the control current decreases as compared to normal.

In one aspect of the present disclosure, the housing has a stopper portion, and the return spring is configured to bias the support member toward the stopper portion in a direction away from the brake rotor.

According to the above aspect, the support member is biased by the return spring toward the stopper portion in the direction away from the brake rotor. Therefore, since the support member is positioned at the position where it abuts on the stopper portion when the electromagnetic coil is not energized with the control current, the pressing plate can be positioned via the shaft member with reference to the stopper portion.

In another aspect of the present disclosure, the electromagnetic brake device further includes an adjusting device including an electric motor that is fixed to the support member by a casing and is configured to drive the shaft member to rotate around the axis as necessary and a motion conversion mechanism that is configured to change the position of the pressing plate with respect to the support member by converting the rotational motion of the shaft member into a linear motion of the pressing plate along the axis.

According to the above aspect, the position of the pressing plate with respect to the support member is changed by converting the rotational motion of the shaft member into linear motion along the axis of the pressing plate by the motion conversion mechanism. Therefore, the position of the pressing plate with respect to the brake rotor during non-braking can be adjusted by rotating the shaft member around the axis by the electric motor and changing the position of the pressing plate with respect to the support member. Thus, even if the friction material wears over time, the positional relationship of the friction material with respect to the brake rotor can be maintained in an appropriate relationship.

Further, in a situation where no control current is supplied to the electromagnetic coil, by rotating the shaft member around the axis by the electric motor, the pressing plate can be moved and pressed against the brake rotor. Therefore, the electromagnetic brake device can be made to function as a parking brake device by controlling the electric motor.

Further, in another aspect of the present disclosure, the load detection device includes a load transmitting member that is fixed to the support member and configured to transmit a load between the shaft member and the support member, and a load sensor that is configured to detect a load transmitted by the load transmitting member by detecting a strain of the load transmitting member.

According to the above aspect, a load is transmitted between the shaft member and the support member via the load transmitting member, and a strain of the load transmitting member which is generated according to the transmitted load is detected by the load sensor as the load transmitted via the load transmitting member. Therefore, the load detection device can detect a load corresponding to a pressing force of the pressing plate against the brake rotor in both cases of the service brake in which the control current is supplied to the electromagnetic coil and the parking brake in which the electric motor is driven.

In addition, the load transmission path between the pressing plate and the support member is not provided with the conversion mechanism incorporated in the conventional electromagnetic brake device shown in FIG. 4 of the above-mentioned Publication. Therefore, the load detection device can detect a load without being adversely affected by the conversion mechanism incorporated in the conventional electromagnetic brake device.

Further, in another aspect of the present disclosure, the shaft member has a flange portion provided on the side of the pressing plate with respect to the load transmitting member, and a thrust bearing is arranged between the flange portion and the load transmitting member.

According to the above aspect, the thrust bearing reduces frictional resistance when the flange portion and the load transmitting member rotate relative to each other. Therefore, as compared to where the thrust bearing is not arranged, it is possible to transmit a load between the flange portion and the load transmission member while ensuring a situation in which the shaft member smoothly rotates with respect to the support member.

Other objects, other features, and attendant advantages of the present disclosure will be readily understood from the description of the embodiments of the present disclosure described with reference to the following drawings.

DETAILED DESCRIPTION

The present disclosure will now be described in detail with reference to the accompanying drawings.

The illustrated electromagnetic brake device 10 is configured as a part of a braking/driving apparatus 12 that generates a driving force and a braking force in a vehicle (not shown), and is integrated with an electromagnetic drive device 14. The braking/driving apparatus 12 is provided corresponding to each driving wheel of the vehicle, and when the vehicle includes driven wheels, only the electromagnetic brake device 10 is provided on the driven wheels. The braking/driving apparatus 12 includes a rotating shaft 20 connected to a wheel 18, which is a member to be braked and driven via a speed reduction mechanism 16, and the rotating shaft 20 rotates around an axis 22 interlocking with the wheel 18. Therefore, as will be described later in detail, the braking/driving apparatus 12 is configured to drive and brake the wheel 18 by applying a driving force and a braking force to the wheel via the rotating shaft 20 and the speed reduction mechanism 16.

In the illustrated embodiment, the electromagnetic drive device 14 is a permanent magnet type AC synchronous electric motor which includes an annular rotor 24 that is integrally fixed to the rotating shaft 20, and a stator 28 that extends annularly around an axis 22 radially outside the rotor 24 and is fixed to a housing 26. The electromagnetic drive device 14 may be an electric motor having any configuration known in the art.

The electromagnetic drive device 14, when a drive current is supplied to the stator 28, rotationally drives the rotating shaft 20 and the rotor 24 by an electromagnetic force, and thereby rotationally drive the wheels 18. The rotating shaft 20 is rotatably supported by the housing 26 on both sides of the rotor 24 via journal bearings 30 and 32. Sealing members 34 and 36 are provided between the rotating shaft 20 and the housing 26 on the opposite side of the rotor 24 to the journal bearings 30 and 32, respectively.

Although not shown in the figure, the electromagnetic drive device 14 is controlled by an electronic control unit for drive control according to an amount of depression of an accelerator pedal by a driver. Further, the electromagnetic drive device 14 may be controlled by the electronic control unit for drive control according to a target vehicle speed or a target acceleration such as auto cruise control and driving support control.

The electromagnetic brake device 10 is disposed on the opposite side of the electromagnetic drive device 14 to the speed reduction mechanism 16, and includes a brake rotor 40, a pressing plate 42, an electromagnetic actuator 44, and return springs 46. An annular hub member 47 is fixed by press-fitting to the right end portion in the drawing (the end portion on the opposite side of the speed reduction mechanism 16) of the rotary shaft 20. The brake rotor 40 is connected to the hub member 47 along the axis 22 by a spline to be displaceable along the axis 22 and non-rotatably around the axis 22 at the inner peripheral portion. Therefore, the brake rotor 40 rotates around the axis 22 together with the rotating shaft 20 and the hub member 47 in response to the rotation of the wheel 18.

As will be described later in detail, the pressing plate 42 is supported to be displaceable along the axis 22 with respect to the brake rotor 40 and non-rotatable around the axis 22 with respect to the housing 48. A friction material 50 is fixed to the surface of the pressing plate 42 facing the brake rotor 40 by welding. As will be described later in detail, the electromagnetic actuator 44 is configured to press the pressing plate 42 against the brake rotor 40 via the friction material 50 by an electromagnetic force as needed. The return springs 46 in the embodiment are compression coil springs and urge the pressing plate 42 in a direction away from the brake rotor 40 (rightward in the drawing). Notably, the pressing plate 42 may be urged by one return spring.

Further, the electromagnetic braking device 10 includes a pressing force transmitting device 52 that transmits an electromagnetic force generated by the electromagnetic actuator 44 to the pressing plate 42 as a pressing force acting along the axis 22 and an adjustment device 54 that adjusts the position of the pressing plate 42 with respect to the brake rotor 40. As will be described later, the pressing force transmitting device 52 and the adjusting device 54 include members common to each other.

The pressing force transmission device 52 includes a substantially disk-shaped support member 56 extending perpendicularly to the axis 22, and a shaft member 58 extending in alignment with the axis 22. The support member 56 is disposed on the opposite side of the pressing plate 42 to the brake rotor 40 and is supported by the housing 48 to be displaceable along the axis 22 and non-rotatable around the axis. The shaft member 58 transmits the force in the direction along the axis 22 between the pressing plate 42 and the support member 56.

The adjusting device 54 includes an electric motor 60 and a motion converting mechanism 62. The electric motor 60 is fixed to a boss portion 56A of the support member 56 by a casing 64 and drives a shaft member 58 to rotate it around the axis 22 as necessary. The electric motor 60 may be any type of AC motor or DC motor known in the art as long as the rotation angle can be accurately controlled. The motion converting mechanism 62 changes the position of the pressing plate 42 with respect to the support member 56 by converting the rotational motion of the shaft member 58 into a linear motion of the pressing plate along the axis 22.

In the illustrated embodiment, a yoke 66 extending in an annular shape around the axis 22 is arranged between the pressing plate 42 and the support member 56 spaced from the pressing plate 42. The yoke 66 is fixed to the housing 48 by radially extending set screws 68 at a plurality of positions spaced around the axis 22. The pressing plate 42 has a step portion 42A. A plurality of pairs of keyways facing each other at a plurality of positions spaced around the axis 22 and extending along the axis 22 are formed on the cylindrical outer peripheral surface of the step portion 42A and the cylindrical inner peripheral surface of the yoke 66 facing the step portion 42A. A key 70 extending along the axis 22 is fitted in each pair of keyways.

Thus, the yoke 66 and the keys 70 allow the pressing plate 42 to displace along the axis 22 with respect to the housing 48 and the like but prevent the pressing plate 42 from rotating about the axis 22 with respect to the housing 48 and the like. A seal member 72 that extends annularly around the axis 22 is disposed between the outer periphery of the pressing plate 42 and the housing 48. The seal member 72 is formed of a metal having excellent strength and elasticity such as spring steel and has a substantially truncated cone shape. The seal member 72 is fixed to the outer peripheral portion of the pressing plate 42 at a small diameter portion, and the large diameter portion is pressed against the inner peripheral surface of the housing 48 by its elasticity, whereby abrasion powders of the friction material 50 and the like are prevented from moving toward the yoke 66 with respect to the pressing plate 42.

The yoke 66 has a staple-shaped cross-sectional shape having an opening that opens toward the side opposite to the pressing plate 42. An electromagnetic coil 74 is arranged in the opening of the yoke 66, and the conductive wire of the electromagnetic coil is wound around the axis 22 in an annular shape. Therefore, the electromagnetic coil 74 is also separated from the pressing plate 42 like the yoke 66. An armature 76 that annularly extends around the axis 22 is fixed to the surface of the support member 56 that faces the yoke 66, and the armature 76 is made of a magnetic material.

When the electromagnetic coil 74 is excited by energization, the yoke 66, the electromagnetic coil 74, and the armature 76 cooperate with each other to generate an electromagnetic attraction force, which pulls the support member 56 toward the yoke 66 against the spring forces of the return springs 46. Therefore, the electromagnetic actuator 44 includes the yoke 66, the electromagnetic coil 74, and the armature 76, and is arranged between the pressing plate 42 and the support member 56.

A plurality of keyways facing to each other at a plurality of positions spaced around the axis 22 and extend along the axis 22 are formed on the outer peripheral edge of the support member 56, a part of the outer peripheral edge of the armature 76, and the inner surface of the housing 48 facing these A key 78 extending along the axis 22 is fitted in each pair of keyways. Thus, the housing 48 and the key 78 allow the support member 56 and the armature 76 to be displaced relative to the housing 48 and the like along the axis 22 but prevent them from rotating about the axis 22 with respect to the housing 48 and the like.

The yoke 66 and the armature 76 are formed with a plurality of pairs of holes facing each other at a plurality of positions spaced around the axis 22 and extending along the axis 22. A return spring 46 extending along the axis 22 is fitted into each pair of the holes in a compressively deformed state. The housing 48 has a stopper portion 80 that extends annularly around the axis 22 on the opposite side of the armature 76 to the yoke 66. The stopper portion 80 has an inner diameter smaller than the outer diameter of the support member 56, and the return springs 46 urge the support member 56 toward the stopper portion 80 in the direction away from the brake rotor 40 (right side in the drawing).

The shaft member 58 of the pressing force transmission device 52 has a male screw 82 on the side of the pressing plate 42 and is connected to the pressing plate by screwing the male screw 82 into a female screw 84 provided on a boss portion of the pressing plate 42. The pitch angle of the male screw 82 and the female screw 84 are set to a small value, and the male screw 82 and the female screw 84 function as a motion converting mechanism 62 that converts the rotational motion of the shaft member 58 into linear motion along the axis 22 of the pressing plate 42 but does not perform the reverse motion conversion.

An end portion of the shaft member 58 opposite to the male screw 82, that is, an outer end portion is supported by the boss portion 56A of the support member 56 to be relatively rotatable around the axis 22 and relatively displaceable along the axis 22 and is connected to an output shaft 86 of the electric motor 60 by a spline. Therefore, the shaft member 58 is relatively rotatable with respect to the support member 56 around the axis 22 and is relatively displaceable along the axis. An O-ring 88 that seals between the boss portion 56A and the male screw 82 is provided.

As can be seen from the above description, the adjusting device 54 causes the shaft member 58 to rotate about the axis 22 by the output shaft 86 of the electric motor 60 and converts the rotational motion into the linear motion of the pressing plate 42 along the axis 22 by the motion converting mechanism 62. Therefore, the adjusting device 54 changes the position along the axis 22 of the pressing plate 42 with respect to the brake rotor 40 when the electric motor 60 is controlled by an electronic control unit 90 for braking control. The electric motor 60 incorporates a rotary encoder 92 for detecting a rotation angle of a rotor, which is not shown in the figure, and thus the rotation angle φm of the output shaft 86. A signal indicating the rotation angle φm detected by the rotary encoder 92 is input to the electronic control unit 90.

A flange 94 is provided at the center of the shaft member 58 in the longitudinal direction, and a load transmission member 96 is attached to the boss portion 56A of the support member 56. The load transmitting member 96 is made of a metal having excellent strength and elasticity, and has a cylindrical portion fixed to a cylindrical inner surface of the boss portion 56A by press-fitting, and an annular plate-shaped portion extending radially inward from the cylindrical portion. A washer 98 is fitted on the shaft member 58 between the flange 94 and the annular plate-shaped portion of the load transmission member 96. Thicknesses of the annular plate-shaped portion and the washer 98 are set so as to gradually decrease toward the radially inner side and the radially outer side, respectively. A thrust bearing 100 is arranged between the flange 94 and the washer 98.

Although not shown in the figure, the side surface of the washer 98 opposite to the thrust bearing 100 has a curved shape slightly protruding toward the annular plate portion of the load transmitting member 96, whereby the washer 98 applies a preload to the tip of the annular plate-shaped portion in the direction away from the thrust bearing. Load sensors 102 each including a detection element such as a strain gauge is fixed to a side surface of the annular plate-shaped portion opposite to the washer 98. The load sensors 102 may be provided at a plurality of positions that are evenly spaced around the axis 22.

A force acting along the axis 22 between the pressing plate 42 and the support member 56 is transmitted via the motion conversion mechanism 62, the shaft member 58, the thrust bearing 100, the washer 98, and the load transmission member 96. An elastic deformation amount of the annular plate-shaped portion of the load transmitting member 96 by the washer 98 changes depending on a magnitude of the transmitted force, and the change is detected by the load sensors 102. Thus, the load sensors 102 cooperate with the washer 98 and the load transmission member 96 to functions as a detection device 104 that detects a load Pa transmitted between the pressing plate 42 and the support member 56 along the axis 22 via the shaft member 58. A signal indicating the load Pa detected by the load sensors 102 is input to the electronic control unit 90 for braking control.

Figure 1:
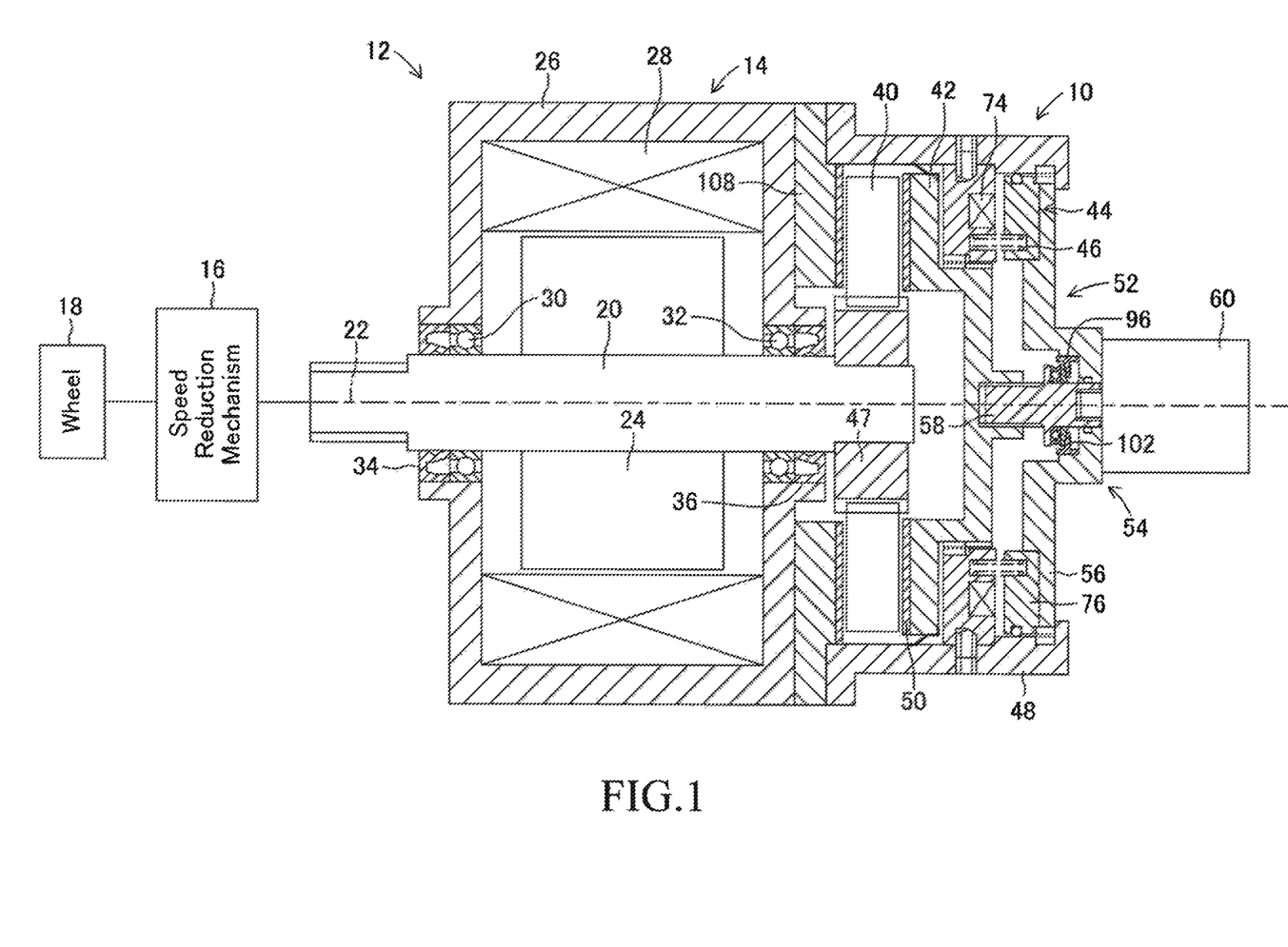
FIG. 1 is a cross-sectional view showing a braking/driving apparatus including an embodiment of an electromagnetic brake device according to the present disclosure.
Figure 2:
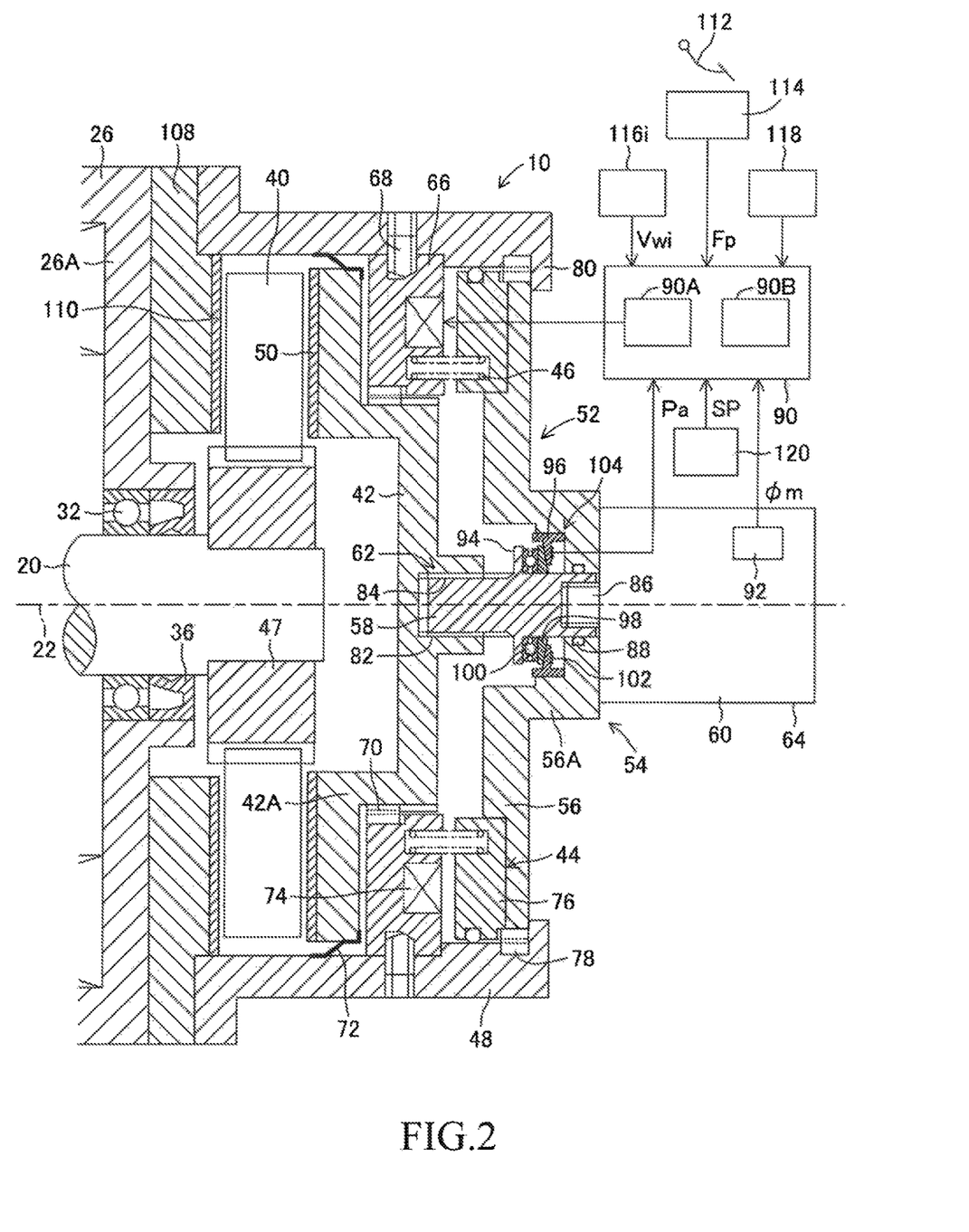
FIG. 2 is an enlarged partial sectional view showing the electromagnetic brake device shown in FIG. 1.
Figure 3:
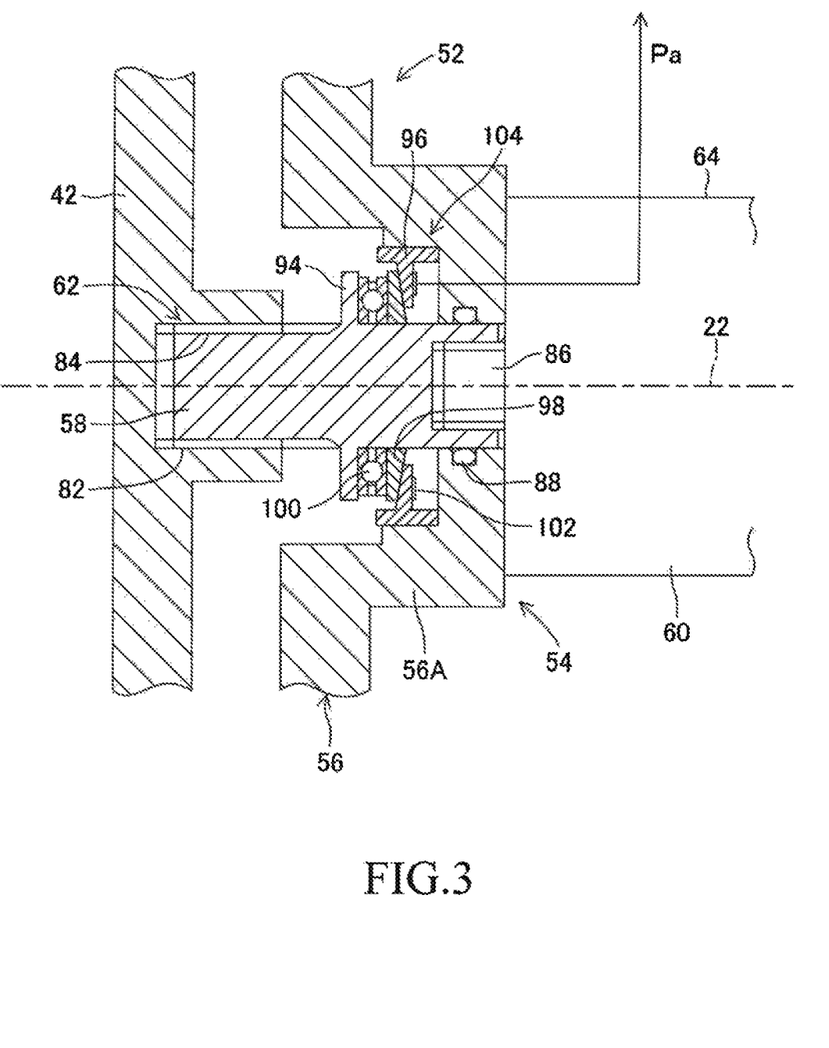
FIG. 3 is an enlarged partial sectional view showing an adjusting device shown in FIGS. 1 and 2.

As shown in FIGS. 1 and 2, a fixed friction member 108 is disposed between the brake rotor 40 and an end wall 26A of the housing 26 of the electromagnetic drive device 14 on the side of the electromagnetic brake device 10. The fixed friction member 108 has an annular plate shape extending around the axis 22 and is in contact with the end wall 26A on the side surface opposite to the brake rotor 40. The fixed friction member 108 is sandwiched between the housing 26 and the housing 48 at the outer peripheral edge portion in the radial direction and is fixed to the housings 26 and 48 by a plurality of bolts (not shown), for example. A friction material 110 is fixed to the side surface of the fixed friction member 108 facing the brake rotor 40 by welding.

Therefore, when an electromagnetic attraction force generated by the electromagnetic actuator 44 is transmitted to the pressing plate 42 as a pressing force along the axis 22 by the pressing force transmission device 52, the brake rotor 40 is pressed against the fixed friction member 108 by the pressing plate 42. As a result, the brake rotor 40 is pressed by the pressing plate 42 and the fixed friction member 108, and a braking force is generated by frictionally engaging the friction materials 50 and 110 welded to the pressing plate 42 and the fixed friction member 108, respectively.

The braking force generated changes according to the pressing force transmitted by the pressing force transmission device 52 and thus changes according to the electromagnetic attraction force generated by the electromagnetic actuator 44. Further, the braking force is applied to the wheels 18 via the rotating shaft 20 and the speed reduction mechanism 16. Therefore, by changing the electromagnetic attraction force generated by the electromagnetic actuator 44, the braking force applied to the wheels 18 is changed.

When the brake rotor 40 is pressed against the fixed friction member 108 by the pressing plate 42, a reaction force is transmitted to the support member 56 via the shaft member 58, the thrust bearing 100, the washer 98, and the load transmission member 96, and is then carried by the housing 48. Therefore, the load Pa detected by the load sensor 102 is an index value of the braking force generated by the brake rotor 40 being pressed by the pressing plate 42 and the fixed friction member 108 and applied to the wheel 18.

As shown in FIG. 2, a pedal effort sensor 114 for detecting a pedal effort Fp applied to a brake pedal 112 by a driver's stepping operation is provided, and a signal indicating a pedal effort Fp detected by the pedal effort sensor 114 is input to the control unit 90. As will be described in detail later, when a signal indicating the pedal effort Fp is input from the pedal effort sensor 114, the electronic control unit 90 controls a current value of a control current supplied to the electromagnetic coil 74 so that a braking force applied to the wheel 18 becomes a value corresponding to the pedal effort Fp.

A signal indicating a wheel speed Vwi of the corresponding wheel is input to the electronic control unit 90 from a wheel speed sensor 116i (i=fl, fr, rl and rr) provided corresponding to each wheel. The vehicle of the embodiment is a four-wheel-drive vehicle, and fl, fr, rl, and rr mean the left front wheel, the right front wheel, the left rear wheel, and the right rear wheel, respectively. In addition, the electronic control unit 90 is supplied with a signal indicating information around the vehicle from another sensor 118, such as a CCD camera for photographing the front of the vehicle, which detects information around the vehicle necessary for vehicle control such as auto cruise control and driving support control. Further, a signal indicating a shift position SP is input to the electronic control unit 90 from a shift position sensor 120 provided on a shift lever (not shown).

Although not shown in FIG. 2 in detail, the electronic control unit 90 includes a microcomputer 90A and a drive circuit 90B. The microcomputer 90A has a CPU, a ROM, a RAM, a backup RAM, and an input/output port device, which are connected to each other by a bidirectional common bus. The electronic control unit for drive control may be configured similarly to the electronic control unit 90, and the electronic control unit 90 and the electronic control unit for drive control exchange information with each other by communication as necessary.

Next, the operation of the electromagnetic brake device 10 configured as described above will be described for a service brake, a parking brake, and automatic braking.

Service Brake

When a pedal effort is applied to the brake pedal 112 by a depression of the driver, the pedal effort sensor 114 detects the pedal effort Fp. The electronic control unit 90 calculates a target load Pat based on the pedal effort Fp so that the larger the pedal effort Fp is, the larger the target load Pat transmitted to the pressing plate 42 via the pressing force transmitting device 52 is. Further, the electronic control unit 90 controls a current value of the control current supplied to the electromagnetic coil 74 of the electromagnetic actuator 44 so that a load Pa detected by the load sensor 102 becomes the target load Pat.

Therefore, an electromagnetic attraction force generated by the electromagnetic actuator 44 is transmitted to the pressing plate 42 as a pressing force, and the brake rotor 40 is pressed against the fixed friction member 108 by the pressing plate 42. As a result, the brake rotor 40 is pressed by the pressing plate 42 and the fixed friction member 108, and a braking force corresponding to the pedal effort Fp is generated and applied to the wheels 18 via the rotating shaft 20 and the speed reduction mechanism 16.

When the pedal effort of the driver on the brake pedal 112 is reduced and released, the pedal effort Fp detected by the pedal effort sensor 114 decreases to zero, and the target load Pat also decreases to zero. Therefore, the electromagnetic attraction force of the electromagnetic actuator 44 is released, and the pressing plate 42, the shaft member 58, the support member 56, and the like are returned to their standard non-braking position by the return springs 46. In the standard non-braking position, the pressing of the pressing plate 42 against the brake rotor 40 is released, so that the braking rotor 40 is not pressed by the pressing plate 42 and the fixed friction member 108, and the braking force is not generated. The standard non-braking position will be described later.

The braking force is controlled by an anti-skid control by the electronic control unit 90 as needed. That is, the electronic control unit 90 calculates a vehicle body speed and braking slip ratios of the wheels based on wheel speeds Vwi detected by wheel speed sensors 116i in a manner known in the art. Furthermore, when the braking slip ratio of any of the wheels is excessive, the electronic control unit 90 controls the braking force of the wheel so that the braking slip ratio of the wheel decreases.

Parking Brake

When a signal indicating that the shift position SP is the parking position is input from the shift position sensor 120 to the electronic control unit 90, the unit controls the electromagnetic brake device 10 in the parking brake mode.

In the parking brake mode, a control current is supplied to the electric motor 60 of the adjusting device 54 for each wheel by the electronic control unit 90, and the current value of the control current is gradually increased. The shaft member 58 is rotationally driven around the axis 22 by the output shaft 86 of each electric motor 60, and the rotational motion is converted into the linear motion of the pressing plate 42 by the motion converting mechanism 62, and the pressing plate is pressed against the brake rotor 40. Therefore, the brake rotor 40 is pressed by the pressing plate 42 and the fixed friction member 108 to generate a braking force, and the braking force is gradually increased.

A reaction force of the braking force is transmitted as a compression load from the pressing plate 42 to the stopper portion 80 of the housing 48 via the shaft member 58, the flange 94, the thrust bearing 100, the washer 98, the load transmission member 96 and the support member 56, and the compression load is detected by the load sensor 102. The electronic control unit 90 terminates the supply of the control current to the electric motor 60 when the detected load Pa exceeds a preset reference value Pap (a positive constant). The reference value Pap is set in advance so that a total sum of the braking forces applied to the four wheels 18 when the load Pa is the reference value Pap is a value sufficient to maintain the vehicle (not shown) in a stopped state.

As described above, the motion converting mechanism 62 converts the rotational motion of the shaft member 58 into the linear motion of the pressing plate 42 along the axis 22 but does not perform the reverse motion conversion. Therefore, even if a reaction force of the braking force acts on the pressing plate 42 as a compressive load from the brake rotor 40, the shaft member 58 does not rotate around the axis 22, so the pressing plate 42 is maintained pressed against the brake rotor 40. Therefore, even if no control current is supplied to the electric motor 60, the braking force of the parking brake is maintained.

When a signal indicating that the shift position SP has changed to a position other than the parking position is input to the electronic control unit 90 from the shift position sensor 120, the electronic control unit controls the electromagnetic brake device 10 in the parking brake release mode. Therefore, the parking brake is released.

In the parking brake release mode, the electric motor 60 of the adjusting device 54 for each wheel is controlled by the electronic control unit 90 so that the electric motor 60 rotates in the direction opposite to that in the parking brake mode. The output shaft 86 of the electric motor 60 rotationally drives the shaft member 58 around the axis 22 in the direction opposite to that in the parking brake mode, and the rotary motion is converted into a linear motion of the pressing plate 42 by the motion converting mechanism 62, o that the pressing plate is moved in a direction away from the fixed friction member 108. Therefore, the pressure of the pressing pressure applied to the brake rotor 40 by the pressing plate 42 and the fixed friction member 108 is reduced to zero, whereby the braking force is gradually reduced and released.

When the braking force is gradually reduced and released, the load Pa detected by the load sensor 102 gradually decreases and finally becomes zero. When the detected load Pa becomes 0, the electronic control unit 90 terminates the supply of the control current to the electric motor 60, thereby completing the release of the parking brake. Further, the electronic control unit 90 stores the rotation angle φm of the output shaft 86 of the electric motor 60 detected by the rotary encoder 92 when the detected load Pa becomes 0 in the backup RAM of the microcomputer 90A as a standard rotation angle φm0.

The standard rotation angle φm0 is a rotation angle for positioning the pressing plate 42 and the like at a standard non-braking position. When the pressure plate 42 and the like is in the standard non-braking position, the brake rotor 40 is not pressed by the pressure plate 42 and the fixed friction member 108, and the friction materials 50 and 110 do not substantially make frictional contact with the brake rotor 40. Moreover, an excessive gap does not occur between the friction materials and the brake rotor.

As can be seen from the above description, the adjusting device 54 functions as a position adjusting device that positions the pressing plate 42 and the like in the standard non-braking position when not braking even when the friction materials 50 and 110 are worn over time. Further, the adjusting device 54 functions as a parking brake actuator that drives the pressing plate 42 and the like to the braking position without requiring excitation of the electromagnetic actuator 44 during parking braking.

It is to be noted that the operation of the adjusting device 54 in the parking brake mode and the parking brake release mode described above is similarly performed when the driver operates a foot brake or a parking brake switch not shown in the drawing.

Automatic Braking

When traveling control of the vehicle such as automatic cruise control and driving assistance control is performed, the electronic braking device 10 is controlled by the electronic control unit 90 as required, whereby automatic braking is performed and a braking force is applied to each wheel. An electronic control unit that controls the traveling of the vehicle calculates a target vehicle speed or a target acceleration/deceleration of the vehicle, and a signal indicating the target vehicle speed or the target acceleration/deceleration is input to the electronic control unit 90.

When the electronic control unit 90 receives a signal indicating the target vehicle speed from the electronic control unit (not shown) for controlling the traveling of the vehicle, the electronic control unit 90 calculates a target acceleration/deceleration of the vehicle based on current vehicle speed and the target vehicle speed. When the target acceleration/deceleration is a target deceleration, the electronic control unit 90 calculates a target braking force of each wheel based on the target deceleration. Further, the electronic control unit 90 controls a current value of the control current supplied to the electromagnetic coil 74 of the electromagnetic actuator 44 of each wheel so that a braking force of each wheel becomes the corresponding target braking force, as in the service braking. Therefore, the vehicle speed is controlled to be the target vehicle speed, or the deceleration of the vehicle is controlled to be the target deceleration.

Effects of the Embodiment

According to the embodiment, the electromagnetic coil 74 and the armature 76 are arranged on the opposite side of the pressing plate 42 to the brake rotor 40 and are spaced apart from the pressing plate, and are supported by the housing 48 and the support member 56, respectively. Therefore, friction heat generated by pressing the pressing plate 42 against the brake rotor 40 via the friction material 50 is less likely to be transmitted to the electromagnetic coil 74 and the armature 76 by heat conduction, so that, as compared with a conventional electromagnetic brake device, a temperature rise of the electromagnetic coil and the armature can be reduced.

Therefore, even if the braking under severe conditions is repeated, the temperature of the electromagnetic coil 74 does not rise excessively. Therefore, it is possible to reduce the risk that, due to the increase in the electric resistance of the conductor of the electromagnetic coil and the decrease in the current value of the control current, an electromagnetic force generated by the electromagnetic coil is reduced as compared with a normal state and a generated braking force is insufficient as compared with a required braking force.

According to the embodiment, the support member 56 is biased by the return springs 46 toward the stopper portion 80 in the direction away from the brake rotor 40. Therefore, since the support member is positioned at a position where it abuts on the stopper portion when the electromagnetic coil 74 is not energized with a control current, the pressing plate 42 can be positioned via the shaft member 58 with reference to the stopper portion.

According to the embodiment, the movement converting mechanism 62 converts the rotational movement of the shaft member 58 into a linear movement of the pressing plate 42 along the axis 22 to change the position of the pressing plate 42 with respect to the support member 56. Therefore, by rotating the shaft member 58 around the axis 22 by the electric motor 60 and changing the position of the pressing plate 42 with respect to the support member, the position (standard non-braking position) of the pressing plate with respect to the brake rotor 40 during non-braking can be adjusted. Thus, even if the friction material wears over time, the positional relationship of the friction material with respect to the brake rotor can be maintained in an appropriate relationship.

Further, by rotating the shaft member 58 around the axis 22 by the electric motor 60 in the situation where no control current is supplied to the electromagnetic coil 74, the pressing plate 42 can be moved and pressed against the brake rotor 40. Therefore, the electromagnetic brake device 10 can be made to function as a parking brake device by controlling the electric motor 60.

Further, according to the embodiment, a load is transmitted between the shaft member 58 and the support member 56 via the load transmitting member 96, and a strain of the load transmitting member which is generated according to the transmitted load is detected by the load sensor 102 of the load detecting device 104 as a load transmitted through the load transmitting member. Therefore, the load detection device 104 can detect the load corresponding to the pressing force of the pressing plate 42 against the brake rotor 40 in both cases of the service brake where the control current is supplied to the electromagnetic coil 74 and the parking brake where the electric motor 60 is driven.

The load transmission path between the pressing plate 42 and the support member 56 is not provided with the conversion mechanism incorporated in the conventional electromagnetic brake device shown in FIG. 4 of Japanese Patent Application Laid-open No. 2019-108916 described above. Therefore, the load detection device 104 can detect the load without being adversely affected by the conversion mechanism incorporated in the conventional electromagnetic brake device.

Further, according to the embodiment, the thrust bearing 100 reduces the frictional resistance when the flange portion 94 and the load transmission member 96 rotate relative to each other. Therefore, as compared to where the thrust bearing is not arranged, it is possible to transmit a load between the flange portion and the load transmission member while ensuring a situation in which the shaft member 58 smoothly rotates with respect to the support member 56.

In particular, according to the embodiment, the yoke 66 that supports the electromagnetic coil 74 is spaced apart from the pressing plate 42 that is pressed against the brake rotor 40 via the friction material 50. Therefore, as compared to where the yoke 66 is in contact with the pressing plate 42, it is possible to reduce the risk of the electromagnetic coil 74 being excessively heated.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiment, the electromagnetic brake device 10 is configured to apply a braking force to the wheel 18 via the rotary shaft 20 and the speed reduction mechanism 16 to brake the wheel. However, the electromagnetic brake device of the present invention may be applied to the purpose of braking a rotating member to be braked other than the wheel.

In the above-described embodiment, the electromagnetic brake device 10 is configured as a part of a braking/driving apparatus 12 that generates a driving force and a braking force in a vehicle and is integrated with an electromagnetic drive device 14. However, the electromagnetic brake device of the present disclosure may be configured to generate a braking force independently of a drive device.

Further, in the above-described embodiment, the electromagnetic actuator 44 has the electromagnetic coil 74 and the armature 76 that cooperate with each other to generate an electromagnetic attraction force, which presses the pressing plate 42 against the brake rotor 40. However, the electromagnetic actuator may generate an electromagnetic repulsive force and press the pressing plate 42 against the brake rotor 40 by the electromagnetic repulsive force.

Further, in the above-described embodiment, the return springs 46 urge the pressing plate 42 in a direction away from the brake rotor 40 by a compressive load. However, the return spring may be configured to bias the pressing plate 42 in the direction away from the brake rotor 40 by a tensile load, such as a tension coil spring.

Further, in the above-described embodiment, the load detecting device 104 is configured to detect a strain by the load sensor 102 by detecting a strain of the load transmitting member 96 which is fixed to the support member 56 and configured to transmit a load between the shaft member 58 and the support member 56. However, the load detection device may be configured to detect a compressive load between the shaft member 58 and the support member 56. Further, the load detecting device may be configured such that the load transmitting member 96 is omitted, and a strain of a member that transmits a load such as the pressing plate 42 is detected.

Further, in the above-described embodiment, the adjusting device 54 rotates the shaft member 58 around the axis 22 by the electric motor 60 to adjust the position of the pressing plate 42 with respect to the brake rotor 40 during non-braking and also functions as an actuator for the parking brake. However, an actuator for the parking brake may be a device other than the adjusting device 54.

What is claimed is:

1. An electromagnetic brake device including a brake rotor that is configured to rotate about an axis in conjunction with a rotating member to be braked, a pressing plate that is supported so as to be displaceable with respect to the brake rotor along the axis and non-rotatable with respect to a housing about the axis, an electromagnetic actuator that generates an electromagnetic force and presses the pressing plate against the brake rotor via a friction material, and a return spring that biases the pressing plate in a direction away from the brake rotor, wherein the electromagnetic brake device includes a pressing force transmission device that transmits an electromagnetic force generated by the electromagnetic actuator to the pressing plate as a pressing force along the axis, and the pressing force transmission device includes a support member that is arranged on the opposite side of the pressing plate to the brake rotor and is supported by the housing to be displaceable along the axis and non-rotatable around the axis, and a shaft member that transmits a force in a direction along the axis between the pressing plate and the support member, the electromagnetic brake device further includes a load detection device that is configured to detect a load transmitted between the pressing plate and the support member via the shaft member, and the electromagnetic actuator includes an electromagnetic coil and an armature that are spaced apart from the pressing plate between the pressing plate and the support member; the electromagnetic coil is supported by the housing; the armature is supported by the support member; and the armature, the support member, the shaft member, and the pressing plate are arranged to move integrally toward the brake rotor when an electromagnetic force is generated by the electromagnetic actuator.

2. The electromagnetic brake device according to claim 1, wherein the housing has a stopper portion, and the return spring is configured to bias the support member toward the stopper portion in a direction away from the brake rotor.

3. The electromagnetic brake device according to claim 1, wherein the electromagnetic brake device further includes an adjusting device including an electric motor that is fixed to the support member by a casing and is configured to drive the shaft member to rotate around the axis as necessary and a motion conversion mechanism that is configured to change the position of the pressing plate with respect to the support member by converting the rotational motion of the shaft member into a linear motion of the pressing plate along the axis.

4. The electromagnetic brake device according to claim 1, wherein the load detection device includes a load transmitting member that is fixed to the support member and configured to transmit a load between the shaft member and the support member, and a load sensor that is configured to detect a load transmitted by the load transmitting member by detecting a strain of the load transmitting member.

5. The electromagnetic brake device according to claim 4, wherein the shaft member has a flange portion provided on the side of the pressing plate with respect to the load transmitting member, and a thrust bearing is arranged between the flange portion and the load transmitting member.

\* \* \* \* \*